(12) United States Patent
Budica

(10) Patent No.: US 6,491,139 B1
(45) Date of Patent: Dec. 10, 2002

(54) FLUID-COOLED BRAKE SYSTEM

(76) Inventor: Lauro Budica, 11645 Humber Dr., Mira Loma, CA (US) 91752

( * ) Notice: Subject to any disclaimer, the term of this patent is extended or adjusted under 35 U.S.C. 154(b) by 0 days.

(21) Appl. No.: 09/713,381

(22) Filed: Nov. 15, 2000

(51) Int. Cl.[7] ............................................. F16D 55/02
(52) U.S. Cl. ................................ 188/71.6; 188/264 D; 188/264 P
(58) Field of Search ........................... 188/71.6, 264 R, 188/264 B, 264 D, 264 F, 264 CC, 264 P, 73.44, 73.45, 73.1, 71.5, 274, 18 A, 218 XL

(56) References Cited

U.S. PATENT DOCUMENTS

| | | | |
|---|---|---|---|
| 4,083,469 A | | 4/1978 | Schexnayder |
| 4,508,200 A | | 4/1985 | Cigognini |
| 4,576,256 A | * | 3/1986 | Rogier ........................ 188/71.6 |
| 4,667,798 A | | 5/1987 | Sailer et al. |
| 4,721,191 A | | 1/1988 | Dowell |
| 4,815,573 A | * | 3/1989 | Miyata ..................... 188/264 F |
| 4,865,168 A | | 9/1989 | Campbell et al. |
| 4,883,149 A | | 11/1989 | Campbell et al. |
| 5,085,295 A | * | 2/1992 | Wautelet et al. ........... 188/73.2 |
| 5,197,574 A | | 3/1993 | Al-Deen et al. |
| 5,322,147 A | | 6/1994 | Clemens |
| 5,355,978 A | | 10/1994 | Price et al. |
| 5,358,077 A | | 10/1994 | DeConti |
| 5,513,720 A | | 5/1996 | Yamamoto et al. |

FOREIGN PATENT DOCUMENTS

GB     2009342 A   *  6/1979

* cited by examiner

Primary Examiner—Pam Rodriguez
(74) Attorney, Agent, or Firm—Knobbe, Martens, Olson & Bear, LLP

(57) ABSTRACT

A liquid cooled brake system for motor vehicles. A mounting bracket having a plurality of mounting members is adapted to be fixedly mounted to an axle spindle assembly. The mounting bracket is adapted to support at least a first stator, a rotor, and at least one caliper assembly. The stator includes a cavity for carrying the cooling liquid that may include a plurality of flow obstacles to reduce the cooling liquid flow velocity so as to enhance the cooling capacity of the system. The stator may also incorporate a plurality of heat sink structures arranged about the stator.

20 Claims, 6 Drawing Sheets

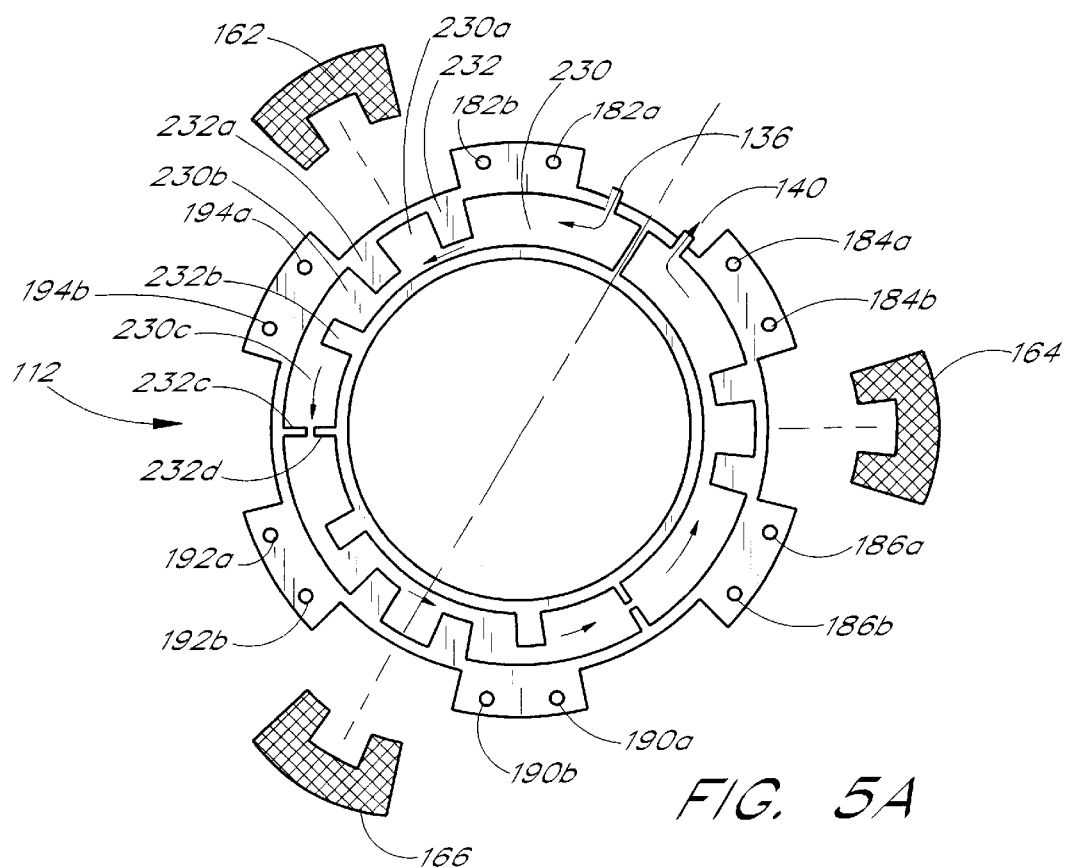
FIG. 5A
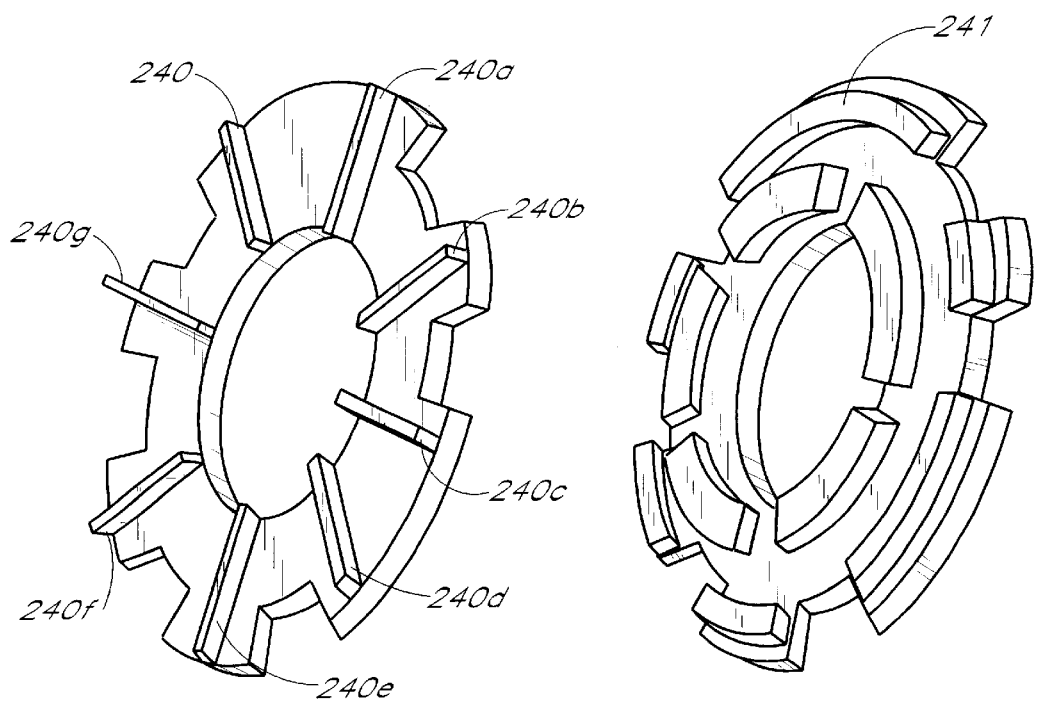
FIG. 5B
FIG. 5C

FLUID-COOLED BRAKE SYSTEM

BACKGROUND OF THE INVENTION

1. Field of the Invention

The present invention relates to a vehicle brake apparatus and, in particular, is comprised of a fluid cooled, circular brake pad arrangement that allows for the increased dissipation of heat for heavy duty braking applications.

2. Description of the Related Art

A typical automotive disk brake includes a circular rotating member called a rotor that is attached to a wheel hub assembly. The rotor and wheel hub are mounted on an axle shaft or spindle of the vehicle via bearings so as to rotate about the axle shaft or spindle. The rotor typically consists of a large diameter flat plate which forms a disk body. The typical disk brake assembly also includes a caliper that has a bracket defining an opening that fits over the outer edge of the rotor. Brake pads are positioned on the inner walls of the opening in the caliper such that a brake pad is positioned adjacent either side of the rotor. The caliper is typically hydraulically, pneumatically or electrically operated such that the pads are urged towards each other to engage with the rotor to slow the speed of rotation of the rotor.

The frictional forces exerted by each pad against each flat metal surface of the rotor will ultimately bring the rotor with attached wheel to a stop, thereby stopping the vehicle. The frictional effect of the pad surface engaging the rotor metal surface creates heat energy that can be dissipated out of the disk brake assembly through a plurality of metal cooling fins that are typically integral to the rotor. The majority of the heat generated by the braking action is dissipated, if at all, through the rotors with very little dissipation of this heat occurring via the brake pad or the caliper because the coefficient of thermal conductivity of the pad is considerably smaller than that of the metal rotor.

The vehicle's pads and rotors typically have a finite life expectancy. Repeated, hard brakings in stop and go traffic will not allow the brake system to dissipate all the generated heat which causes premature wear on the pads as well as on the rotors. High temperature heating of the rotors contributes to a scoring and glazing of the rotor and pad surface which can reduce the braking effectiveness of the vehicle. Moreover, this heat can cause the rotor to warp over time.

The premature wear pattern and performance limitation of the conventional disk brake system dictate a need for a braking concept that can accommodate more rigorous braking situations. To address these needs, alternative disk brake configurations have been developed.

For Example U.S. Pat. No. 4,508,299 to Cigognini discloses a braking system that includes a rotating rotor with a braking head assembly that has a plurality of cooling passages provided therein. The braking head assembly frictionally engages with the rotating rotor so as to slow the rotating rotor to thereby brake the vehicle. The existence of cooling passages in the braking head assembly increases the cooling capacity of the Cigognini brake assembly and thereby reduces wear on the rotor.

While the Cigognini reference discloses a brake assembly that has improved cooling capacity, the Cigognini brake assembly is difficult to mount and provides only limited cooling capacity. In particular, the movable brake head in the Cigognini assembly is mounted adjacent the rotor via one or more rods that are apparently attached to the frame of the vehicle and extend toward the rotor so as to retain the brake head in proximity to the rotor. This mounting structure requires the installer to mount the rods to the frame of the vehicle which is not always possible with some vehicle configurations. Moreover, due to the relative length of the rods, the braking assembly is more prone to damage and is expensive to manufacture. Further, due to the relative complex mounting assembly for the brake heads, this mounting arrangement makes it difficult for the brake heads to be positioned about more than a limited amount of the circumference of the rotor which results in less braking capability as there is limited surface area of the brake head in contact with the rotor.

Even more significantly, the Cigognini design does not permit the brake assembly to be used in conjunction with brake assemblies that are mounted adjacent movable spindles. In particular, the movable brake head in the Cigognini design moves as a result of actuation of the fixed length rods. Since these rods are permanently attached to the frame of the vehicle, this system cannot be used with brakes on swiveling spindles as the rods do not accommodate any movement of the brake head relative to the rods. Hence, the Cigognini design could not be used on standard automobile front brake systems as the front brakes are attached to swiveling spindles which allow the vehicle to be steered.

It will be appreciated that the majority of braking power that is applied to automobiles and trucks is applied to the front brakes. Consequently, the front brakes are the brakes that are most likely to suffer from excessive heating. The Cigognini design is thus not well suited for use with automobiles, trucks and the like as it cannot be used to cool front brake assemblies that provide the majority of braking for these types of vehicles.

Further, while Cigognini discloses a cooling chamber in the brake head, the fluid in the brake head can flow unimpeded through the brake head. The cooling fluid may therefore be isolated to limited areas of the brake head due to forces on the vehicle during braking. This can lead to isolated areas of the brake head being cooled at different rates than other areas which can, over time, result in damage to the brake head or the rotor. Moreover, the cooling fluid may have to be circulated through the passageway at a faster rate which thereby decreases the efficiency of the heat transfer to the cooling fluid. This can result in limiting the cooling of the brake assembly causing the problems discussed above.

From the foregoing, it will be appreciated that there is a continuing need for brake systems that can provide better brake performance and improve the longevity of the brake components. To this end, there is a continuing need for brake systems with better cooling capability that are less expensive and easier to mount to existing vehicles. More particularly, there is a need for a system for cooling brake components that can be adapted for use with brake assemblies that are movable with respect to the frame of the vehicle, such as the brake assemblies on the front wheels of road vehicles.

SUMMARY OF THE INVENTION

The aforementioned needs are satisfied by the brake assembly of the present invention which, in a first aspect, is comprised of a brake assembly having a mounting bracket that is adapted to be positioned about the axle or spindle of a vehicle wherein the mounting bracket has a plurality of arms that extend radially outward from the axle or spindle of the vehicle, a rotor assembly that is rotatably attached to the axle or spindle of the vehicle, and at least one stator that is attached to the mounting arms of the mounting bracket so as to be slidable in a direction that is parallel to the axis of the vehicle axle or spindle such that the at least one stator can engage with the rotor to thereby slow the angular rotation of the rotor wherein the at least one stator is liquid cooled to remove heat generated by the frictional engagement between the rotor and the at least one stator. The assembly further comprises a caliper that defines a cavity that fits around at least a portion of the outer perimeter of the at least one stator and the rotor such that activation of the caliper will result in lateral movement of the stator along the direction of the axis of the axle such that the at least one stator can engage the rotor.

Hence, in this aspect, the brake assembly allows for the use of liquid cooled stators which are better able to remove ambient heat away from the rotor to improve brake performance. Moreover, since the stators are slidably mounted to the mounting arms of the mounting bracket such that the stators can move slidably along pins or guides in a direction that is parallel to the axis of the axle or spindle, installation of the brake assembly is simplified.

In one particular embodiment, two stators are slidably mounted to pins that are positioned on the mounting arms of the mounting bracket such that the rotor can be interposed between two stators. In one implementation, the rotor comprises two circular friction disks attached to the rotor at the stator interface. A caliper assembly can then be positioned about the outer perimeter of the stators such that the stators can be urged inward so as to contact the rotors. In one embodiment, a plurality of mounting arms extend radially outward from the center of the mounting bracket such that a plurality of sliding posts can be positioned about the outer perimeter of the rotor to thereby permit uniform slidable connection points for each of the stators. In this embodiment, a plurality of calipers can thus be used to urge the stators towards the rotor to thereby halt the rotational motion of the rotor.

As the stators are liquid cooled, the stators can remove a greater amount of heat energy occurring as a result of the stators frictionally engaging with friction material positioned on the rotor. In one aspect, each of the stators has channels formed therein that have flow inhibiting structures positioned so as to extend in a direction generally perpendicular to the flow of the cooling fluid to thereby slow the rate of the cooling fluid to allow for greater transfer of heat to the cooling fluid. In another aspect, the cooling fluid is pumped to a cooling reservoir and the stators are also equipped with cooling fins to thereby increase the cooling of the stators to improve the removal of heat from the brake assembly.

It will be appreciated that the brake assembly is better able to remove heat than non-cooled brake assemblies of the prior art and are easier to mount than existing cooled brake assemblies of the prior art. Moreover, since the assembly is mountable via a bracket to the spindle of the vehicle, the brake assembly can be mounted on swivelable front wheels of vehicles thereby permitting cooling of the front brakes of vehicles which typically account for the majority of braking power applied to the vehicle and are more in need of increased cooling capacity. These and other objects and advantages of the present invention will become more fully apparent from the following description taken in conjunction with the accompanying drawings.

BRIEF DESCRIPTION OF THE DRAWINGS

FIG. 5A is a cross sectional view of a single stator of the brake system of FIG. 2 illustrating the fluid channel cavity with the respective fluid flow direction;

FIG. 5B is a side or perspective view of the stator of FIG. 5A illustrating cooling fins extending in a radial outward pattern on the outward surface of a stator;

FIG. 5C is a side or perspective view of the stator of FIG. 5A illustrating cooling fins extending circumferentially around the outer surface of the stator.

DETAILED DESCRIPTION OF THE PREFERRED EMBODIMENT

Figure 1:
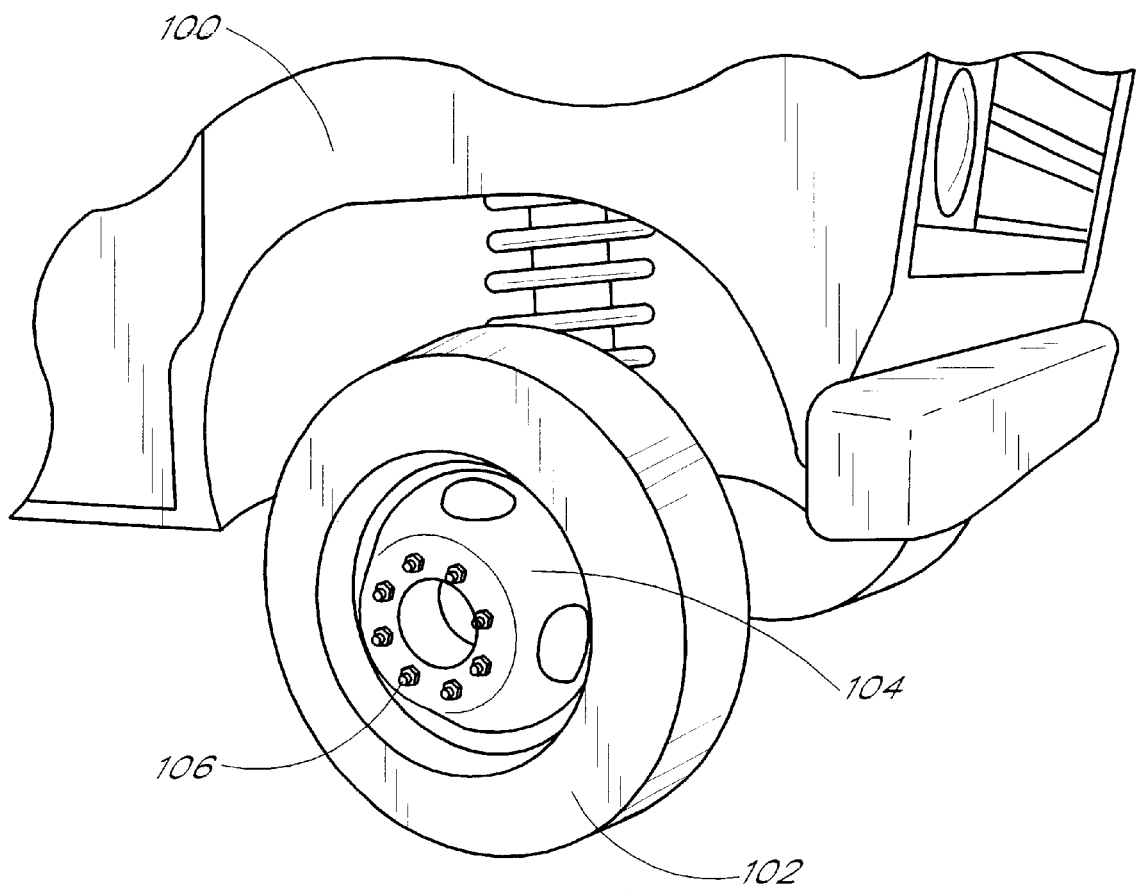
FIG. 1 is a perspective view of a vehicle illustrating a wheel attached to a vehicle.

Reference will now be made to the drawings wherein like numerals refer to like parts throughout. FIG. 1 illustrates the wheel assembly of a vehicle 100. The vehicle has a typical tire and wheel assembly, wherein the vehicle tire 102 is mounted to a wheel 104 and the wheel 104 is attached to a wheel hub assembly. A plurality of wheel lugs 106 are used to secure the vehicle tire 102 with the attached wheel 104 to the wheel hub assembly in a well-known manner. As is understood in the art, a brake assembly is generally attached to the wheel hub assembly such that activation of the brake assembly results in the frictional forces being applied to slow the rate of rotation of the wheel hub assembly and the wheel 104 with the tire 102.

In this embodiment, a fluid cooled brake assembly 150 (FIG. 2) is attached to the wheel hub assembly and can therefore be used to slow the rotation of the wheel 104. It will be appreciated from the following description that the cooled brake assembly 150 can be adapted for use in conjunction with any wheels of a vehicle, including front, rear or intermediate wheels, and can further be adapted for use with driving and non-driving wheels of the vehicle without departing from the spirit of the present invention.

Figure 2:
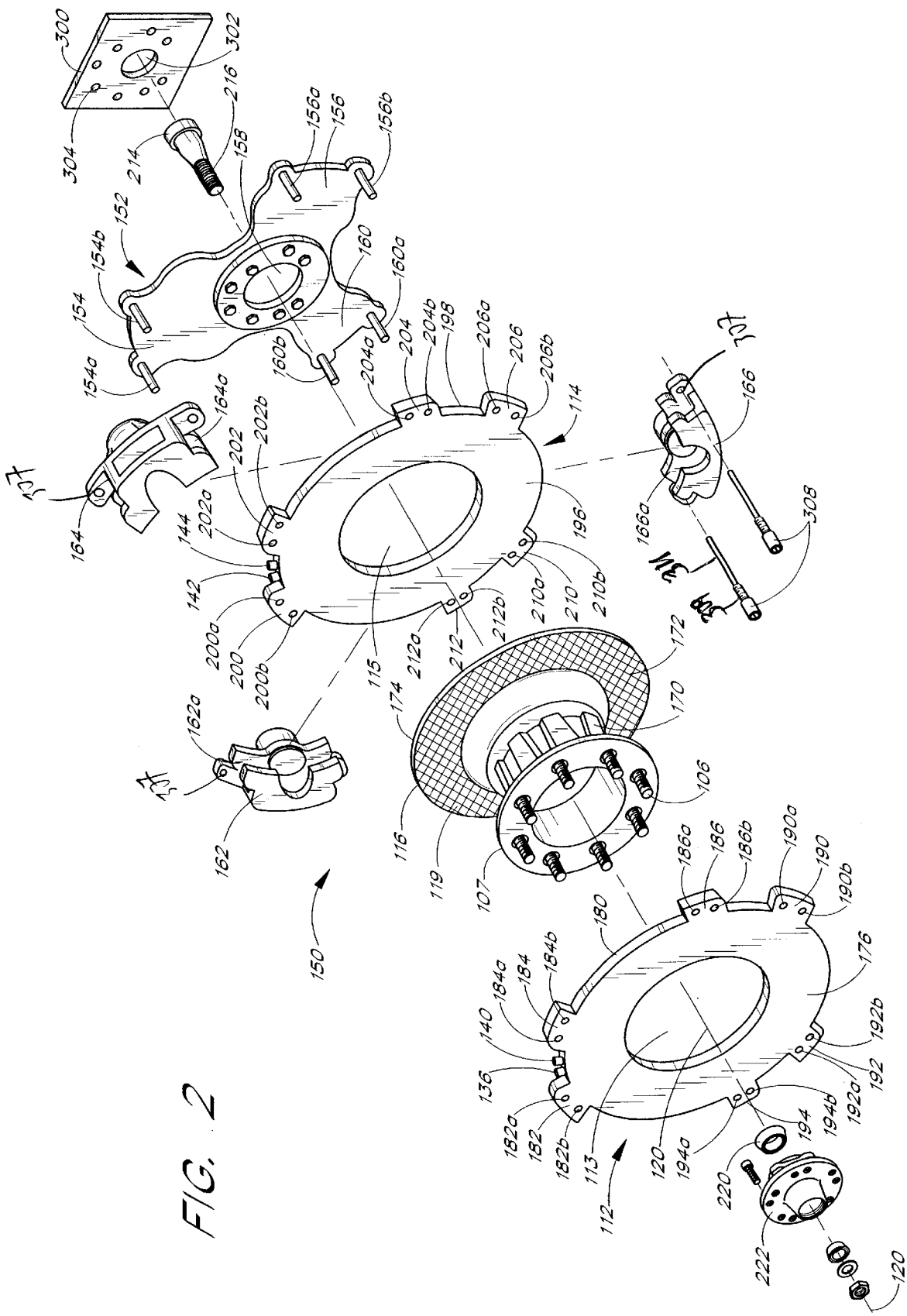
FIG. 2 is an exploded perspective view of one embodiment of a brake system of the present invention.
Figure 3:
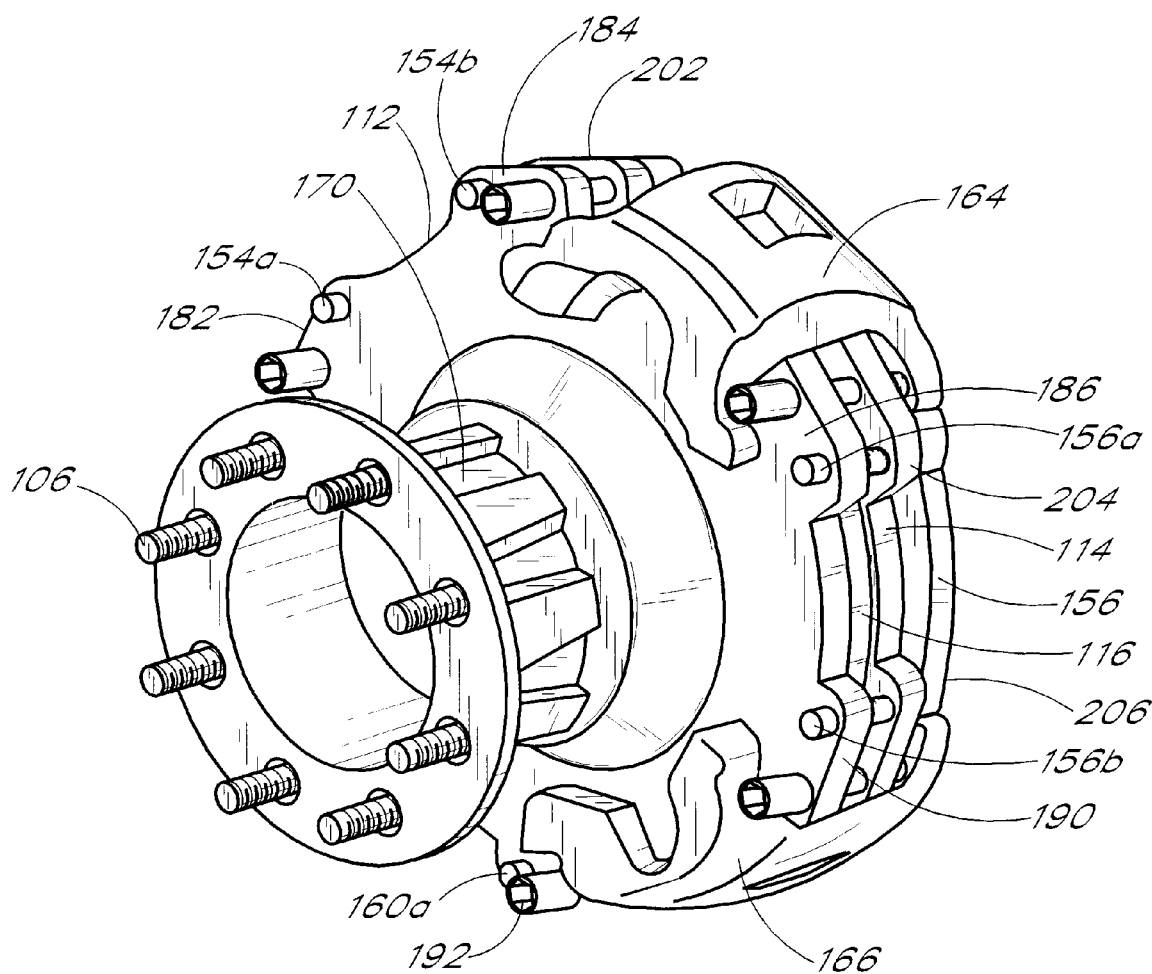
FIG. 3 is a perspective view of the brake system of FIG. 2 in an assembled configuration.

Referring now to FIGS. 2 and 3, the exploded view of the components of one embodiment of a fluid-cooled brake system 150 is illustrated. In particular, the brake system 150 includes a circular first stator 112 and a circular second stator 114. The first stator 112 has a first opening 113 that is approximately ⅔ the diameter of the first stator 112. The second stator 114 also has a circular, second opening 115 which is ⅔ the diameter of the second stator 114. The first stator 112 and the second stator 114 are approximately 0.625 inch in thickness and are both slidably mounted to a mounting bracket 152 in a manner that will be described in greater detail below.

Located between the first stator 112 and the second stator 114 is a circular shaped metal rotor 116 with a thickness of approximately 0.625 inch. The rotor 116 and the stators 112, 114 are preferably centered about a first axis of rotation 120. As will be described in greater detail below, the rotor 116 rotates about the first axis of rotation 120 between the first stator 112 and the second stator 114 and has friction material 119 positioned on the front and rear faces of the rotor 116 in the manner shown in FIG. 2.

A mounting bracket 152 is mounted to the vehicle axle or spindle assembly, wherein an axle spindle 214 with a threaded end 216 extends through a first opening 158 of the mounting bracket 152. The mounting bracket 152 is attached to a mounting plate 300 that is typically part of the original equipment of the vehicle. The mounting plate 300 has an opening 302 through which the axle spindle 214 extends therethrough. The plate also has a plurality of openings 304 that are spaced about the plate to permit attachment of the mounting bracket 152 allowing the brake calipers to be secured to the vehicle. The mounting bracket 152 is adapted to make use of the openings 304 to be secured about the axle or spindle of the vehicle. Because the mounting bracket 152 is mounted directly to the mounting plate 300, if the spindle is movable, the bracket 152 will move with the spindle. Hence, the mounting bracket 152 can be mounted on the steering wheels of a vehicle.

The mounting bracket 152 includes the bracket members 154, 156 and 160 that extend radially outward from the center of the bracket 152. Each bracket member 154, 156, and 160 extends outward in a plane parallel to the second stator 114 and the first stator 112 with a length approximately equal to the radius of the first stator 112 and the second stator 114.

A plurality of metal dowel pins or slides 154a, 154b through 160a, 160b, each approximately 2.25 inches in length and 0.25 inch in diameter, are fastened to the mounting bracket members 154 through 160 respectively. In particular, the dowel pins 154a, 154b through 160a, 160b are positioned at the outer edge of each of the bracket members 154, 156, and 160, respectively, and extend perpendicularly outward from the plane of the mounting bracket 152 so as to extend in the direction of the axis 120. The pins or slides define a mounting location for the stators 112, 114 as will be described in greater detail hereinbelow.

As is also illustrated in FIGS. 2 and 3, the second stator 114 includes mounting flanges 200 through 212 located at the outer perimeter that are adapted to engage with the dowels 154a, 154b, 156a, 156b and 160a, 160b so that the second stator 114 can be slidably mounted on the mounting bracket 152. In particular, the second stator 114 is attached to the bracket 152, so that the rear surface 198 of the second stator 114 is adjacent the mounting bracket 152. The dowel pin 154a of the first bracket member 154 inserts through the second stator mounting flange hole 200a. The dowel pin 154b of the first bracket member 154 inserts through a second stator mounting flange hole 202a. The dowel pin 156a inserts through a second stator mounting flange hole 204b and the dowel pin 156b inserts through a second stator mounting flange hole 206a. The dowel pin 160a inserts through a second stator mounting flange hole 210a, and the dowel pin 160b inserts through a second stator mounting flange hole 212b. In this way, the second stator 114 can be easily mounted to the mounting bracket 152.

As is also illustrated in FIG. 2, the rotor 116 includes a rear rotor surface 174 and a front rotor surface 172 that engages with the stators 112, 114 respectively so as to provide braking of the vehicle in a manner that will be described in greater detail below. Both the front and rear rotor surface 172, 174 are preferably covered with a friction material such as is commonly used in the art. The rotor 116 is generally disk shaped and has dimensions that are approximately equal to the dimensions of the stators 112, 114. As is also illustrated in FIGS. 2 and 3, the rotor 116 includes an extending assembly 170 that is adapted to permit attachment of the wheel onto the rotor 116 via a plurality of lugs or bolts 106. The rotor 116 is attached to the spindle 214 via a well-known bearing assembly 222 in a manner that will be described in greater detail hereinbelow.

As is also shown in FIGS. 2 and 3, the first stator 112 is generally circular in shape with a circular opening 113 positioned in the center. The first stator 112 also includes a plurality of mounting flanges 182, 184, 186, 190, 192 and 194 that each have two openings formed therein where one of the openings receives the slides 154a, 154b through 160a, 160b and the other opening receives the bolts 308 that secure the calipers 162, 164, 166 to the assembly in a manner that will be described in greater detail below. The openings 182a, 184a, 186b, 190a 192a and 194b are adapted to receive the dowels 154a, 154b, 156a, 156b, and 160a, 160b, respectively, of the mounting bracket 152 so that the stator 112 can also be slidably mounted to the bracket 152 with the rotor 116 interposed between the first stator 112 and the second stator 114 in the manner shown in FIG. 3. The opening 113 in the first stator 112 is preferably sized so that the wheel extender 170 of the rotor 116 extends through the opening 113 of the first stator 112 to permit the wheel 104 to be attached thereto.

The assembly 150 also includes a known wheel bearing 220 that is coupled to the axle spindle 214. In particular, a hub assembly 222 of the bearing assembly 220 is screwed onto the threaded end 216 of the axle spindle 214 to rotatably capture the rotor 116 to the axle spindle 214 in a well-known manner. The wheel hub extender 170 is attached to the rotor 116 and defines a location to which the wheel 104 can be mounted to the rotor 116. As the rotor 116 is rotatably mounted to the axle spindle 214, the wheel 104 is thus rotatably mounted to the vehicle thereby permitting rolling motion of the vehicle over the ground. It will be appreciated that while the rotor assembly 116 includes a wheel hub extender, the improved brake assembly of the present invention can be used in conjunction with rotor assemblies that do not have such wheel hub extenders without departing from the spirit of the present invention.

In this particular embodiment, a first caliper 164, a second caliper 166, and a third caliper 162 are secured to an outer edge surface of the first stator 112, the rotor 116, and the second stator 114 so as to be spaced about the outer perimeter of the stators 112, 114 and rotor 116. The calipers 162, 164 and 166 are similar to existing calipers in the art and each has an inner cavity 162a, 164a and 166a. A hydraulically, pneumatically or electrically activated clamping mechanism is located within the cavities 162a, 164a and 166a such that application of the brakes results in a decrease in the width of the cavities 162a, 164a and 166a. As is illustrated in FIG. 3, each of the calipers 162, 164 and 166 are positioned about the first stator 112, the second stator 114 and the rotor 116 such that an outer edge of each of the first stator 112, the rotor 116 and the second stator 114 are positioned within the cavities 162a, 164a and 166a of the calipers 162, 164 and 166 respectively. Hence the clamping mechanism within each of the calipers 162, 164 and 166 result in the stators 112, 114 being urged against the surfaces of the rotor 116 in a manner that will be described in greater detail below.

In particular, the dowel pins 154 through 160 on the bracket mounting member 152 are adapted to maintain the first stator 112 and the second stator 114 in alignment with the spinning rotor 116 while permitting the stators 112, 114 to slide along the dowels in the direction of the axis 120 in response to clamping by the calipers 162, 164, 166. The first stator 112 and the second stator 114 thus exert an inward force, perpendicular to the plane of the rotor 116 and in the same plane as the first axis of rotation 120, wherein these equal, but opposing, inward forces act to squeeze the rotor 116 thereby slowing the angular motion of the rotor 116 and the resultant linear motion of the vehicle.

FIG. 3 illustrates a perspective view of the brake system 150 components of FIG. 2 in an assembled state. The first caliper 164 and the second caliper 166 are shown in a final assembled position positioned about the combination of the first stator 112, the rotor 116, and the second stator 114, wherein the first caliper 164, the second caliper 166 and the third caliper 162 are used to apply a concurrent inward force on the first stator 112 and the second stator 114 so as to move the stators 112, 114 inward toward each other along the dowels so as to exert a frictional force against the rotor 116. These combined and opposing forces against the rotor 116 act to slow or stop the angular motion of the rotor 116 which is attached to the wheel rim 104 and consequently stopping the forward or reverse movement of the vehicle 100.

Figure 4:
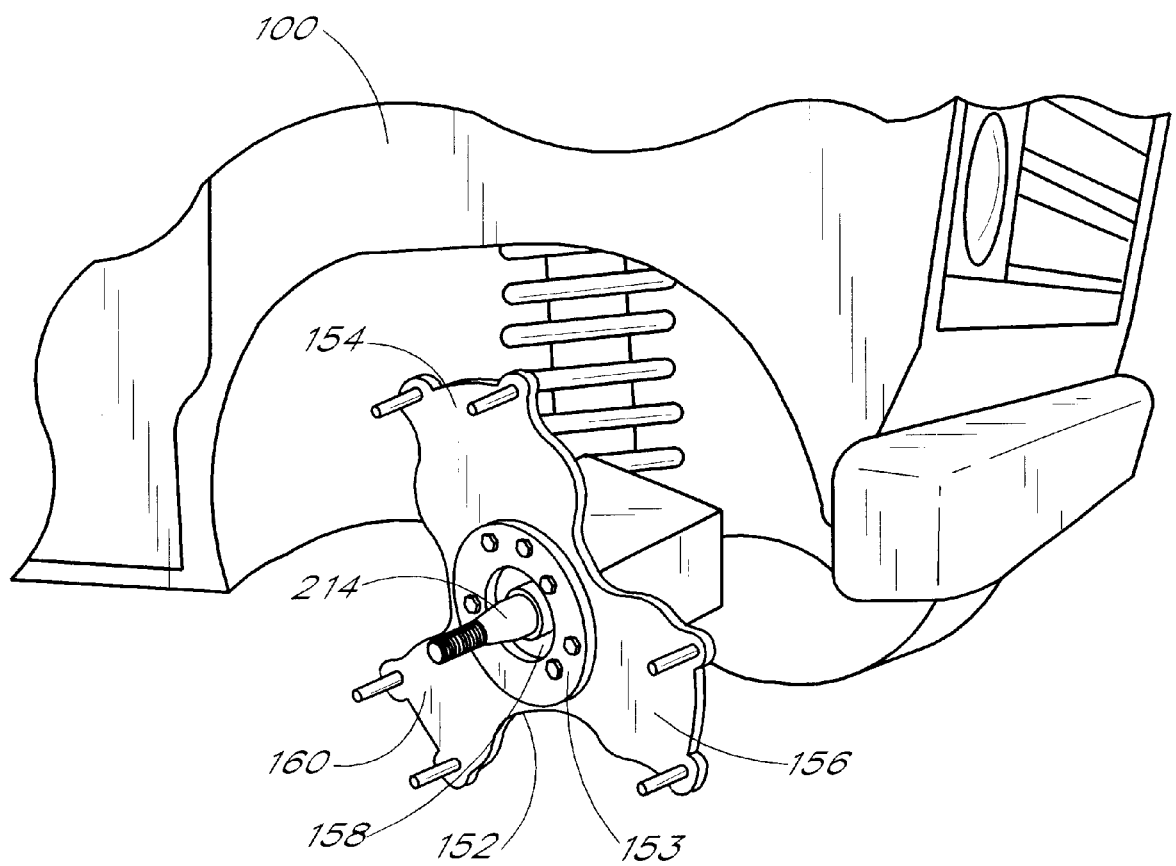
FIG. 4 is a perspective view of the brake system mounting bracket attached to a vehicle front spindle.

A perspective view of the brake system 150 mounting bracket 152 is illustrated in FIG. 4. The axle spindle 214 can be seen extending outward perpendicular to the first member 154, the second member 156, and the third member 160 of the mounting bracket 152. The mounting bracket 152 is mounted on the spindle assembly 214 such that the spindle extends through a central opening 158 in the mounting bracket 152. As discussed, above, the bolts 308 extend through the openings 182b, 184b, 186a, 190b, 192b, 194a in the first stator 112 and through the openings 200b, 202b, 204a, 206b, 210b, and 212a in the second stator 114 and into the apertures 307 on the calipers 162, 164, 166 respectively. The bolts 308 have a threaded portion 309 that engage with the stator 112 and a non-threaded portion 311 that provides a surface upon which sliding of the stator 114 can occur. In this way, the calipers 162, 164 and 166 can be mounted to the assembly such that the brake assembly can be actuated regardless of the orientation of the brake assembly during turning of the vehicle.

The spindle or axle of the vehicle defines a mounting point for the assembly such that if the mounting point is a spindle that is swivelable with respect to the vehicle, e.g., it is the spindle of a movable steering wheel of the vehicle, and the plate 300 is attached to the spindle in this manner, the assembly will move with the spindle. In particular, because the mounting bracket 152 mounts so as to be centered about the spindle 214, the mounting brackets can define the connection points for the stators 112, 114 that are centered about an axis 120 defined by the spindle 214. Hence, the mounting bracket 152 provides an easy system for mounting the brake assembly 150 to a vehicle and allows the assembly to be used on movable wheels of the vehicle, such as front wheels used to steer the vehicle. Moreover, since the calipers 162, 164 and 166 are clamp calipers that are positioned about the outer perimeter of the stators 112, 114 the installation of the brake system 150 is greatly facilitated.

FIG. 5A is a cross-sectional view representing the interior configuration of either of the stators 112, 114. As illustrated, a continuous inner cavity 230, 230a–c occupies a substantial volume of the stators 112, 114 and is capable of carrying heat transfer fluid therethrough to cool the brake assembly 150. The continuous inner cavity 230, 230a–c of the stators 112, 114 is interrupted by a plurality of fluid flow obstacles 232, 232a–d wherein the fluid flow obstacles 232, 232a–d are purposely formed when the first stator plate 112 is machined or cast. In particular, the continuous inner cavity 230, 230a–c extends generally circumferentially around the stators 112, 114. As will be described in greater detail below, cooling fluid is introduced at an input port 136 and travels around the cavity 230, 230a–c in the direction of the arrows towards an output port 140. A plurality of flow obstacles 232, 232a–d are positioned about the circumferential flow cavity 230, 230a–c so as to extend generally perpendicularly into the direction of flow of the cooling fluid between the input port 136 and the output port 140. Hence, the flow obstacles 232, 232a–d slow down and control the rate of flow of the fluid between the input port 136 and the output port 140.

Figure 6:
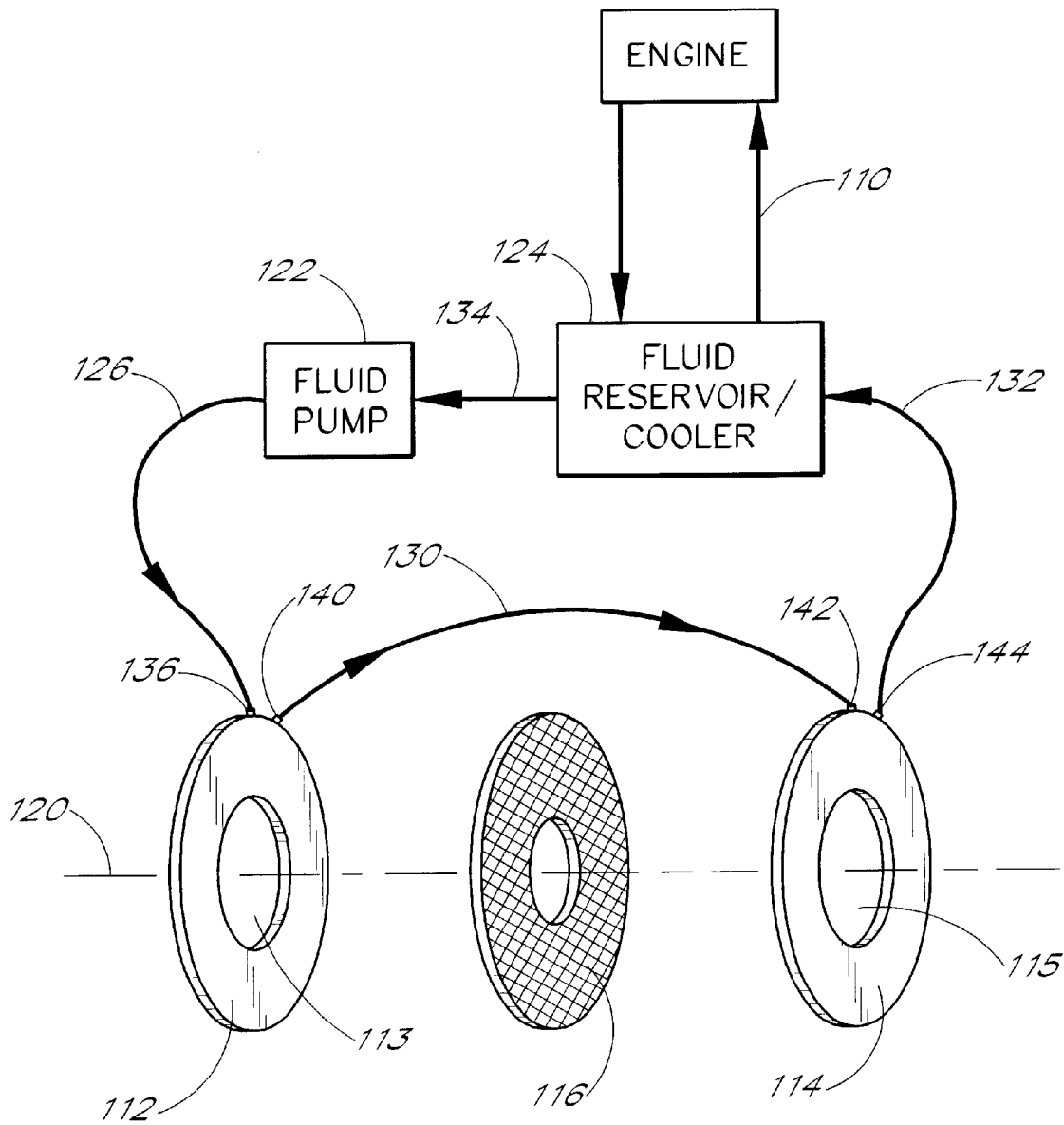
FIG. 6 is a schematic view of the brake assembly of FIG. 2 illustrating a rotor positioned between a first stator, a second stator and the series fluid cooling circuit comprising a fluid pump and fluid cooling reservoir.

A reduction in cooling fluid flow provides the fluid additional time to allow the transfer of heat from the surrounding area of the inner stator surface of the stators 112, 114 to the fluid, thereby improving the efficiency in heat transfer. As shown in FIG. 6, this additional heat energy is continually and sequentially carried out from the first stator plate 112 through a fluid line 130 to the second stator 114, through the second stator 114, through a return fluid line 132 to a fluid reservoir-cooler 124. A pump 122 is used to circulate the fluid through the fluid reservoir/cooler 124 and the stators 112, 114. It will be appreciated that the fluid reservoir/cooler 124 may actually be comprised of the engine radiator and radiator coolant is circulated through the brake assembly from the radiator. It will be appreciated that the transferred heat is dissipated and cooled in the fluid reservoir-cooler 124 providing a more efficient and productive fluid-cooled braking system 150. While the schematic of FIG. 6 illustrates that the cooling fluid from one stator is provided to a second stator in a serial fashion, the cooling fluid can also be independently provided from the cooling reservoir directly to the different stators without departing from the spirit of the present invention.

Another embodiment of the stators 112, 114 is illustrated in FIG. 5B. As illustrated, a plurality of cooling fins 240, 240a–g extend in a radial outward pattern on the front stator surface 176 of the first stator 112. Each cooling fin 240, 240a–g is a rectangular bar of metal equally spaced from each other, whereas one end of the cooling fin 240, 240a–g extends from the edge of the opening 113 of the stators 112 radially outward to the edge of the outer surface 176 of the stator 112. The plurality of cooling fins 240, 240a–g act as a large heat sink, wherein convection cooling allows the heat generated in the braking components to be transferred to the surface area of the cooling fins 240, 240a–g and dissipated to the circulating air past the wheel assembly during forward movement of the vehicle.

FIG. 5C illustrates another embodiment of the stators 112, 114. As is illustrated, a plurality of cooling fins 241 extending in a circumferential pattern is formed on the front stator surface 176 of the first stator 112. Each cooling fin 241 is a generally rectangular bar of metal that creates a heat sink that further facilitates cooling of the brake assembly 100. It will be appreciated that any of a number of different configurations of cooling fins can be used on the stators to increase the cooling capacity of the brake assembly 100 without departing from the spirit of the present invention.

In one embodiment, the coolant system of FIG. 6 is adapted to be able recirculate coolant fluid through the brake assembly 150 during periods when the brakes are not being used. This allows for the cooling fins to cool the coolant fluid thereby increasing the overall cooling capacity of the vehicle. It will be appreciated that if the fluid reservoir is the vehicle radiator, and the vehicle is travelling uphill, being able to circulate the coolant through the stators 112, 114 that have cooling fins attached thereto in the manners shown in FIG. 5B and 5C improves the ability of the vehicle to cool the coolant and avoids overheating of the vehicle radiator.

Hence, the brake assembly 150 provides an assembly that includes stators 112, 114 that are liquid cooled and are thus capable of removing increased amounts of heat produced as a result of the stators 112, 114 engaging with the rotating rotor 116. Moreover, the use of a mounting bracket 152 that is positioned about the axis of the axle allows for the stators to be slidable along pins that extend in the direction of the axis. Since the stators are slidable along the pins, clamp calipers can then be mounted about the stators and rotors to enable the stators to be urged into contact with the rotor to slow the rotor. Hence, the present configuration of the brake assembly 150 permits easier mounting of the brake assembly than cooled brake assemblies of the prior art and also allows the assembly to be used in conjunction with movable wheels of vehicles.

Moreover, the configuration of the liquid passages also greatly improves the efficiency of the cooling of the brake assembly thereby permitting the application of greater braking forces. The mounting arrangement permits the mounting of calipers about essentially the entire perimeter of the stators and rotors due to the use of the mounting bracket which allows for much greater braking forces to be applied.

It will be appreciated that since the stators are cooled, lighter weight stators can be used for braking purposes in the vehicle. This results in an overall reduction in the weight of the vehicle and also allows for the use of light weight standardized stators for different vehicles.

Although the foregoing description of the preferred embodiment of the present invention has shown, described and pointed out the fundamental novel features of the invention, it will be understood that various omissions, substitutions, and changes on the form of the detail of the apparatus as illustrated as well as the uses thereof, may be made by those skilled in the art without departing from the spirit of the present invention. Consequently, the scope of the present invention should not be limited to the foregoing discussions, but should be defined by the appended claims.

What is claimed is:

1. A brake assembly for braking a vehicle comprising:
   a mounting bracket adapted to be mounted about an axle of a vehicle, the mounting bracket having at least one pin extending outward from the bracket in the direction of the axis of rotation of the axle;
   a rotor defining a planar surface rotatably mounted to the axle of the vehicle so as to extend in a plane generally perpendicular to the plane of the axis of rotation of the axle;
   at least one stator defining a planar surface and having passages formed therein to permit fluid flow through the passages, wherein the at least one stator is mounted on the at least one pin of the mounting bracket so as to extend in a plane generally parallel to the plane of the rotor and wherein the at least one stator is slidably movable along the at least one pin in the direction of the axis of the axle so that a planar surface of the at least one stator can engage the planar surface of the rotor;
   a caliper that has an opening sized to receive the rotor and the at least one stator, wherein the caliper is mounted about the outer perimeter of the rotor and the at least one stator and wherein the caliper can selectively urge the at least one stator to slide along the at least one pin so as to engage with the rotor; and
   a cooling system for providing cooling fluid to the passages of the at least one stator so that the fluid can remove heat generated by the engagement of the planar surface of the at least one stator and the rotor from the proximity of the rotor.

2. The brake assembly of claim 1, wherein the mounting bracket comprises an opening adapted to receive the axle therethrough and a plurality of arms that extend radially outward from the opening.

3. The brake assembly of claim 2, wherein the at least one pin comprises a plurality of pins mounted on the ends of the plurality of arms.

4. The brake assembly of claim 1, wherein the at least one stator comprises a first stator and a second stator that are each positioned on the at least one pin so as to be slidably movable along the at least one pin.

5. The brake assembly of claim 4, wherein the rotor is interposed between the first and the second stators and wherein the caliper engages the first and the second stators so as to move the stators towards each other so that the rotor is engaged on two sides by the first and the second stators.

6. The brake assembly of claim 5, wherein the cooling system provides cooling fluid first to the first stator and then from the first stator to the second stator.

7. The brake assembly of claim 1, wherein the at least one stator includes a plurality of flow obstacles positioned therein so that the fluid flows through the passages formed in the stator at a rate selected to maximize the heat transfer from the stator to the fluid flowing therethrough.

8. The brake assembly of claim 7, wherein the passages in the at least one stator includes a central passageway extending circumferentially around the at least one stator and the flow obstacles comprise a plurality of radially extending members that extend into the central passageway.

9. The brake assembly of claim 1, wherein the cooling assembly includes a radiator and a pump wherein the radiator is located so as to allow for the heat generated by the interaction between the at least one stator and the rotor to be dissipated away from the brake assembly.

10. The brake assembly of claim 1, wherein the at least one stator includes a plurality of fins positioned on an exposed surface of the at least one stator wherein the plurality of fins increase the surface area of the stator and permit greater transfer of heat generated by the interaction between the rotor and the at least one stator to the surrounding air.

11. The brake assembly of claim 1, further comprising a second caliper positioned about the perimeter of the at least one stator and the rotor.

12. The brake assembly of claim 11, further comprising a third caliper positioned about the perimeter of the at least one stator and the rotor.

13. A brake assembly adapted to be mounted on a turnable wheel assembly of a vehicle for braking the vehicle, comprising:
   a first liquid cooled stator movably mounted to a wheel assembly of the vehicle, so as to be movable in a first direction;
   a second liquid cooled stator movably mounted to a wheel assembly of the vehicle so as to be movable in a second direction wherein the first and second liquid cooled stators have passages formed therein to permit fluid flow through the passages;
   a rotor attachably mounted to the wheel assembly of the vehicle so as to be interposed between the first and second liquid cooled stators wherein the rotor defines first and second braking surfaces and wherein the first and second liquid cooled stators are movable in the first and second directions that are perpendicular to the plane of the first and second braking surfaces of the rotor and wherein the first and second liquid cooled stators are mounted to the wheel assembly to permit movement in the first and second directions relative to the rotor over a range of angular positions of the wheel assembly during turning of the vehicle;

at least one caliper that is coupled to the first and second stators so that the at least one caliper engages with the first and second stators so that the at least one caliper urges the first stator in the first direction and the second stator in the second direction to engage with the rotor to thereby inhibit rotation of the rotor to brake the vehicle, wherein the at least one caliper is mounted to the wheel assembly; and a cooling system for providing cooling fluid to the passages of the at least one stator so that the fluid can remove heat generated by the engagement of a planar surface of the at least one stator and the rotor from the proximity of the rotor wherein the cooling system provides cooling fluid first to the first stator and then from the first stator to the second stator.

14. The assembly of claim 13, further comprising a mounting bracket that mounts to the wheel assembly of the vehicle so as to move in a turning arc in response to turning of the vehicle, wherein the mounting bracket includes a plurality of pins that extend in a direction parallel to the first and second directions and wherein the first and second stators are mounted to the mounting bracket so as to be slidably mounted on the plurality of pins to permit sliding movement of the first and second stators on the plurality of pins in the first and second directions with respect to the rotor.

15. The assembly of claim 14, wherein the mounting bracket comprises an opening adapted to receive an axle therethrough and a plurality of arms that extend radially outward from the opening.

16. The assembly of claim 15, wherein the plurality of pins are mounted on the ends of the plurality of arms of the mounting bracket.

17. The assembly of claim 13, wherein the first and second stator includes a plurality of flow obstacles positioned therein so that the liquid flows through the passages formed in the stators at a rate selected to increase the heat transfer from the first and second stators to the liquid flowing therethrough.

18. The assembly of claim 17, wherein the passages in the first and second stators include a central passageway extending circumferentially around the first and second stators and the flow obstacles comprise a plurality of radially extending members that extend into the central passageway.

19. The assembly of claim 13, wherein the first and second stators include a plurality of fins positioned on an exposed surface of the first and second stators wherein the plurality of fins increase the surface area of the stators and permit greater transfer of heat generated by the interaction between the rotor and the first and second stators to the surrounding air.

20. The brake assembly of claim 13, wherein the at least one caliper comprises three calipers positioned about the outer circumference of the first and second stators.

* * * * *